(12) United States Patent
Ryals et al.

(10) Patent No.: US 7,040,604 B2
(45) Date of Patent: May 9, 2006

(54) WIRE GUIDE

(75) Inventors: Steven Ryals, Pinson, AL (US); Frederick James Diggle, III, Birmingham, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 197 days.

(21) Appl. No.: 10/706,716

(22) Filed: Nov. 12, 2003

(65) Prior Publication Data

US 2005/0098767 A1    May 12, 2005

(51) Int. Cl.
*B65H 59/00* (2006.01)
(52) U.S. Cl. ............................................ 254/134.3 FT
(58) Field of Classification Search ....... 254/134.3 FT, 254/134.3 R, 134.3 PA, 389; 292/157; 226/193
See application file for complete search history.

(56) References Cited

U.S. PATENT DOCUMENTS

| | | | |
|---|---|---|---|
| 1,000,043 A | 8/1911 | Scism | |
| 4,719,315 A | 1/1988 | Gregorac | |
| 5,236,177 A * | 8/1993 | Tamm | ................ 254/134.3 FT |
| 5,654,526 A | 8/1997 | Sharp | |
| 5,661,263 A | 8/1997 | Salvaggio | |
| 5,713,700 A | 2/1998 | Vogelsang | |
| 6,173,721 B1 | 1/2001 | Mery | |
| 6,378,844 B1 * | 4/2002 | Weaver | ................ 254/134.3 R |
| 6,548,760 B1 | 4/2003 | Stout, Jr. | |
| 2003/0230343 A1 | 12/2003 | Phipps | |

OTHER PUBLICATIONS

"Contractor Enclosures and Wireway," Hoffman Enclosures, Inc. catalog, 2001, pp. 2, 20-23, 26-35, available on Feb. 18, 2004 at http://www.hoffmanonline.com/PDFCatalog/Commercial/Index.htm.
"E.M.T. Set-Screw Connectors," Iberville Products catalog, pp. 17-22, Thomas & Betts, available on Feb. 18, 2004 at http://www.tnb-canada.com/catalogues/pdf/en/iberville_roughing_in/roughing_01g_eng.pdf.
"EMT Fittings," Arlington Industries Inc. catalog, Jul. 23, 2002, available on Feb. 18, 2004 at http://www.aifittings.com/b_2.htm.
"Glossary of Electrical Industry Terms," available on Feb. 18, 2004 at http://www.hub24x7.com/wiring/raco_bell/pdf/glossary.pdf.
"Lightguide Fiber Optic Protection System," Norfolk Wire & Electronics catalog, 2002, available on Feb. 18, 2004 at http://www.connectworld.net/bulkcable/routingraceway2.html.
"Technical Information," Dynamic Coatings, Inc. technical information, available on Feb. 18, 2004 at http://www.dynamiccoatingsinc.com/technical.htm.

(Continued)

*Primary Examiner*—Robert C. Watson
(74) *Attorney, Agent, or Firm*—Lee & Hayes, PLLC

(57) ABSTRACT

An apparatus for guiding wire into or out of a raceway includes a raceway attachment, a retainer and a wire guide. The wire guide is attached to the raceway attachment by the retainer. Further, the wire guide is capable of receiving and guiding the wire such that the wire does not contact an end of a raceway.

20 Claims, 7 Drawing Sheets

OTHER PUBLICATIONS

Knisley, J., "Selecting Wire and Cable Management Systems," Electrical Construction and Maintenance, Mar. 1, 2003, available at http://ecmweb.com/ar/electric_selecting_wire_cable/index.htm.

* cited by examiner

WIRE GUIDE

BACKGROUND

The subject invention generally and in various embodiments relates to devices for guiding wire, and more specifically to an apparatus for pulling wire into and/or out of a raceway such that the wire is not damaged.

Electricians or technicians often are required to install a run of line or cord through raceways, which may include lengths of conduit, ducts, etc. Once the line or cord has been installed through the raceway, the installed line may provide a pull cord in order to pull runs of wire (e.g., electrician or communication wire) back through the raceway. When the runs of wire are pulled through the raceway using the installed line, and in particular where the wire enters and/or exits at an angle, the edge of the raceway entrance/exit may scrape the wire causing damage.

One way in which technicians may run wire to prevent this damage is to prop up the wire such that there is virtually no angle in which the wire enters and/or exits the raceway. This is an attempt to prevent the wire from contacting the edge of the raceway entrance/exit. However, these methods of running a wire are often not available to the electrician or technician as they may require other objects (e.g., boxes, etc.) in which the wire must be propped upon to attain the desired entrance/exit height. Further, the electrician or technician also must be able to pull the wire into and/or out of the raceway without pulling at an angle. As a good portion of raceways are installed in walls and ceilings, which are difficult to access in a linear fashion, these methods of pulling wires to prevent engagement with the edges of the raceway are difficult, if not impossible, to accomplish.

SUMMARY

Various embodiments of the present invention include an apparatus for guiding wire. The apparatus includes a raceway attachment, a retainer and a wire guide attached to the raceway attachment by the retainer. The wire guide is capable of receiving and guiding the wire such that the wire does not contact an end of a raceway.

Various embodiments of the present invention include an apparatus for guiding wire having a raceway sleeve, a wire guide and a retainer. The retainer attaches the raceway sleeve to the wire guide. The wire guide is also capable of receiving and guiding the wire such that the wire does not contact an end of a raceway.

Other systems, methods, and/or products according to embodiments will be or become apparent to one with skill in the art upon review of the following drawings and detailed description. It is intended that all such additional systems, methods, and/or products be included within this description, be within the scope of the present invention, and be protected by the accompanying claims.

BRIEF DESCRIPTION OF THE DRAWINGS

In the accompanying Figures, there are shown embodiments of the present invention wherein like reference numerals are employed to designate like parts and wherein.

DETAILED DESCRIPTION

Figure 1:
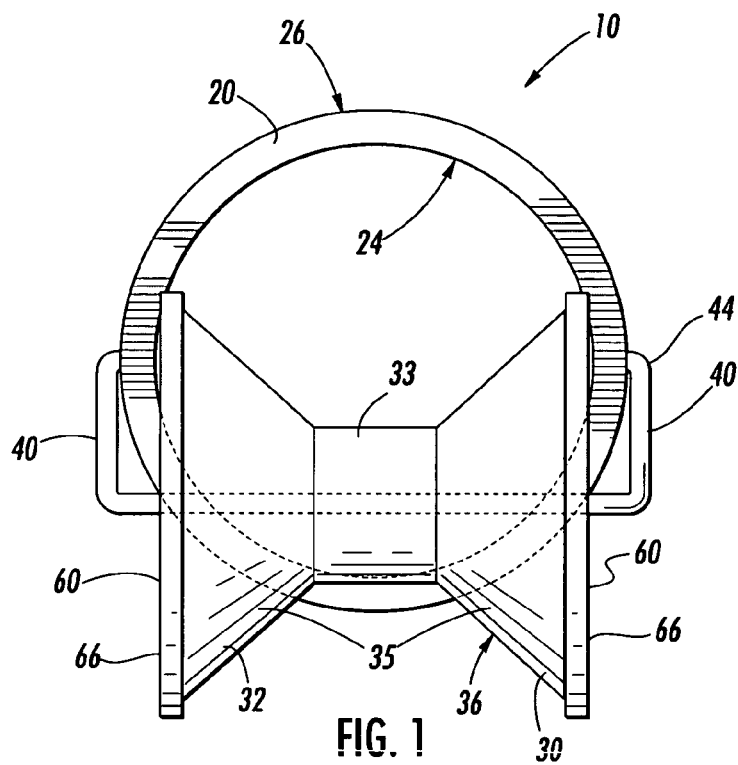
FIG. 1 is a front view of an apparatus for guiding wire according to various embodiments of the present invention.

Referring now to the drawings for the purpose of illustrating the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top", "bottom", "upper" or "lower" are relative characterizations only based upon the particular position or orientation of a given component for a particular application.

FIGS. 1–4 depict various embodiments of an apparatus 10 for guiding a wire 800 having a raceway attachment 20, retainer 44 and a wire guide 30 that generally may be used by a technician (not shown), for example. As shown, the raceway attachment 20 is capable of attachment to an end 980 of a raceway 900. The raceway 900 may be, for example, a conduit, duct, enclosed channel, etc. The wire guide 30 is attached to the raceway attachment 20 by the retainer 44 and is capable of receiving and guiding the wire 800 such that the wire 800 does not contact the end 980 of the raceway 900. See FIGS. 3, 4.

In various embodiments, the raceway attachment 20 is attached to the wire guide 30 by retainer 44, which may have attachment arms 40. Alternatively, one or more attachment arms 40 may be used such that the position of the wire guide 30 remains in place where the wire 800 does not contact the end 980 of the raceway 900. Other attachment arms 40 may be used such as, for example, a plastic arm, a flexible wire, etc.

The retainer 44 is resilient. As shown, the retainer 44 is hingedly attached to the raceway attachment 20 by attachment arms 40. The retainer 44 forms a single body having two attachment arms 40. Further, the retainer 44 passes through the wire guide 30 to maintain the position of the wire guide 30. Thus, the attachment arms 40 hingedly attach the raceway attachment 20 to the wire guide 30. As mentioned above, alternative attachments (not shown) may be used. These alternative attachments (not shown) may prevent the wire guide 30 from pivoting and may further fixedly attach the wire guide 30 to the raceway attachment 20.

Figure 2:
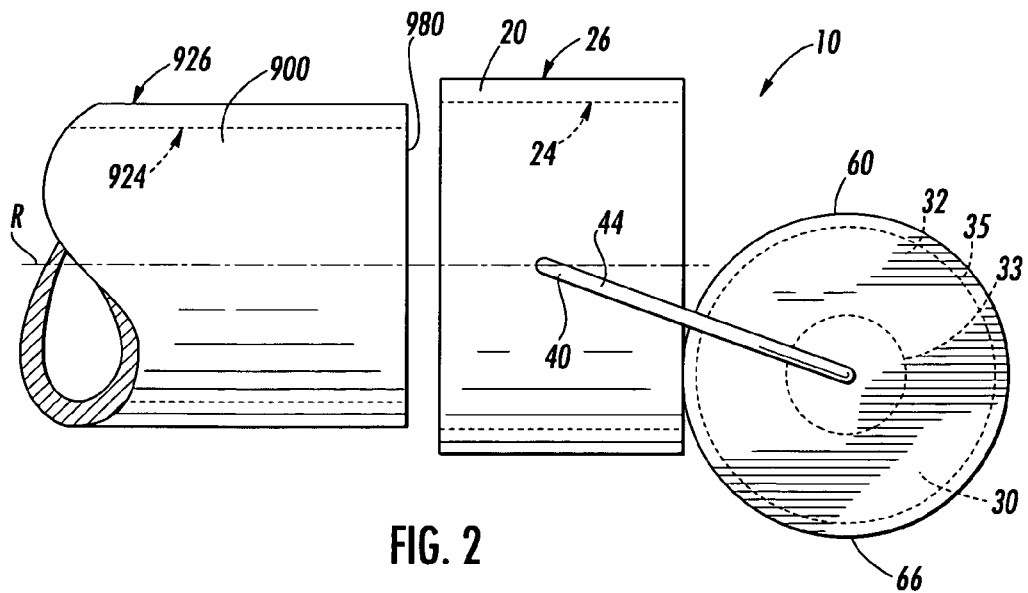
FIG. 2 is a side view the apparatus for guiding wire of FIG. 1.
Figure 3:
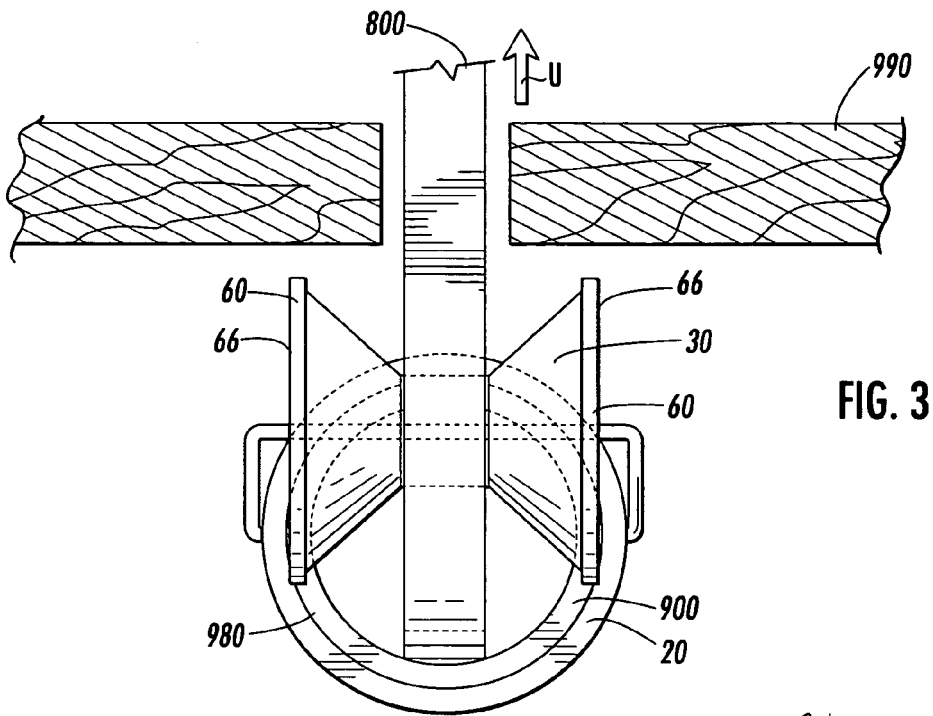
FIG. 3 is a front view of an apparatus for guiding wire according to various embodiments of the present invention.
Figure 4:
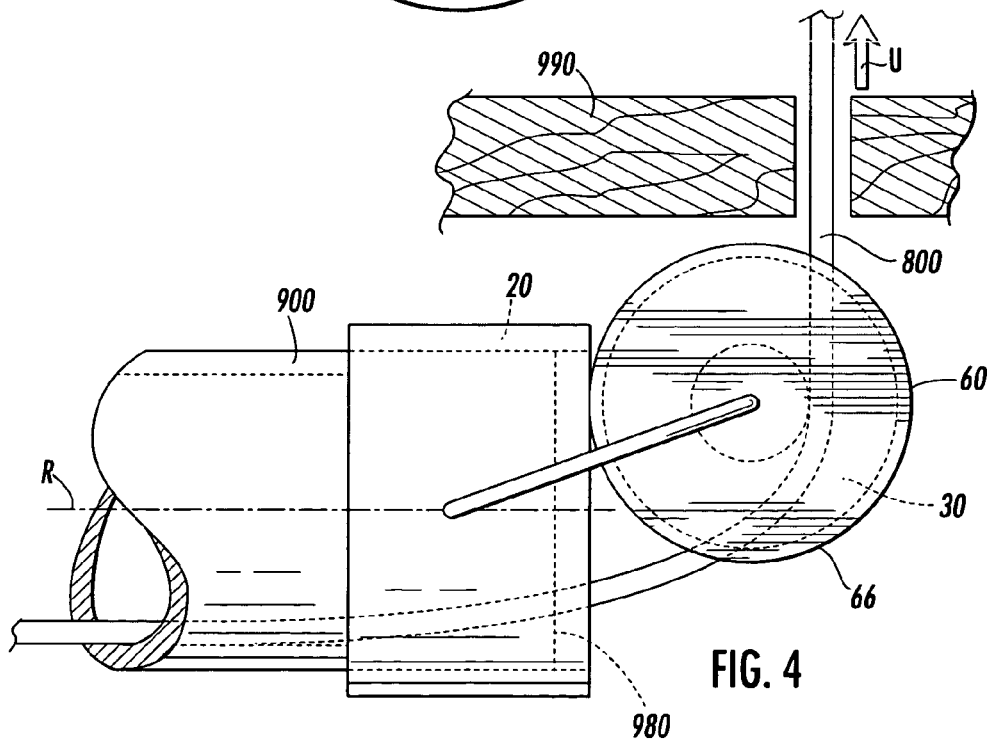
FIG. 4 is a side view the apparatus for guiding wire of FIG. 3.

In various embodiments, the raceway attachment 20 has an inner surface 24 and an outer surface 26. Likewise, the raceway 900 has an inner surface 924 and an outer surface 926 as shown in FIG. 2. The raceway attachment 20 can releasably attach to the outer surface 926 of the end 980 of the raceway 900. FIGS. 3 and 4 show the raceway attachment 20 releasably attached to the end 980 of the raceway 900. This attachment causes the inner surface 24 of the raceway attachment 20 to abut the outer surface 926 of the raceway 900. Further, as illustrated, the raceway attachment 20 has a friction fit between the raceway attachment 20 and the raceway 900. However, other ways of attachment are possible such as, for example, gluing, welding, etc.

FIGS. 3 and 4 show the wire guide 30 as configured to guide and retain the wire 800 in abutment with the wire guide 30. As shown in FIGS. 1–4, the wire guide 30 is a pulley 32. The pulley 32 has a recessed portion 33 and frustoconical portions 35. The recessed portion 33 of the pulley 32 is where the wire 800 remains in abutment with the pulley 32. As can be seen in FIGS. 3 and 4, the wire 800 rests in the recessed portion 33 of the wire guide 30, or pulley 32. The frustoconical portions 35 encourage the wire 800 to remain in the recessed portion 33. However, other configurations may be used to encourage the wire 800 to remain in the recessed portion 33. Thus, the wire guide 30 receives the wire 800.

The pulley 32 generally is formed from a material that is nonabrasive and has a substantially smooth outer surface 36. However, other materials may be used that enhance the friction between the pulley 32 and the wire 800. Examples of such materials include, but are not limited to, polymeric materials such as rubbers, plastics, etc. These materials allow the wire 800 to pass over the pulley 32 without damaging the wire 800 as illustrated in FIGS. 3 and 4.

FIGS. 1–4 depict the apparatus 10 as generally cylindrical in shape. However, the apparatus 10 may be configured in a variety of shapes such that the apparatus 10 is capable of attachment to the end 980 of the raceway 900. In one embodiment, the raceway 900 is cylindrical. Other shapes and configurations may be used with the apparatus 10 as it may be configured to conform to other shapes and configurations.

In various embodiments, the apparatus 10 further includes spacers 60. Alternatively, one or more spacers 60 may be used. The spacers 60 are positioned adjacent to the wire guide 30 and further contact the raceway attachment 20. The spacers 60 are provided in FIGS. 1–4 to facilitate the rotation of the wire guide 30 such that friction does not prevent such rotation. Thus, the spacers 60 prevent the wire guide 30 from directly contacting the raceway attachment 20.

The spacers 60 are depicted in FIGS. 1–4 as washers 66. The washers 66 may be made of various materials that have a relatively low coefficient of friction to facilitate rotation of the wire guide 30. Examples of such materials may include, but are not limited to, metal, nylon, etc.

FIGS. 3 and 4 illustrate the wire 800 as it is being pulled in an upward direction U, past a structure 990. The structure 990 may be a floor, for example. As shown, the wire 800 is resting in the raceway 900. The wire 800 is contacting the wire guide 30 such that the wire guide 30 receives and guides the wire 800 so that the wire 800 does not contact the end 980 of the raceway 900. The wire 800 is directed by the wire guide 30 to exit the raceway 900 through a central location in a vertical orientation in FIG. 3. In addition, the pull of the wire 800 in the upward direction U, prevents the wire 800 from contacting the end 980 of the raceway 900.

In various embodiments, the positioning of the wire guide 30 is such that the recessed portion 33 is closer to the radial center R of the raceway 900 than the inner surface 924 of the raceway 900. This position at a more central location, directs the wire 800 away from the end 980 of the raceway 900 at the entrance and/or exit of the raceway 900. Thus, the wire guide 30 guides the wire 800 such that the wire 800 does not contact the end 980 of the raceway 900.

The electrician or technician (not shown) would affix at least one raceway attachment 20 to at least one end 980 of the raceway 900 to pull the wire 800 through the raceway 900. This process may also be used at the entrance and exit of the raceway 900 if two raceway attachments 20 are utilized. Thus, the technician may affix two raceway attachments 20 to the raceway 900 on each end 980. As shown, the wire 800 would be positioned over the wire guide 30 and pulled such that the wire 800 does not contact the end 980 of the raceway 900.

Figure 5:
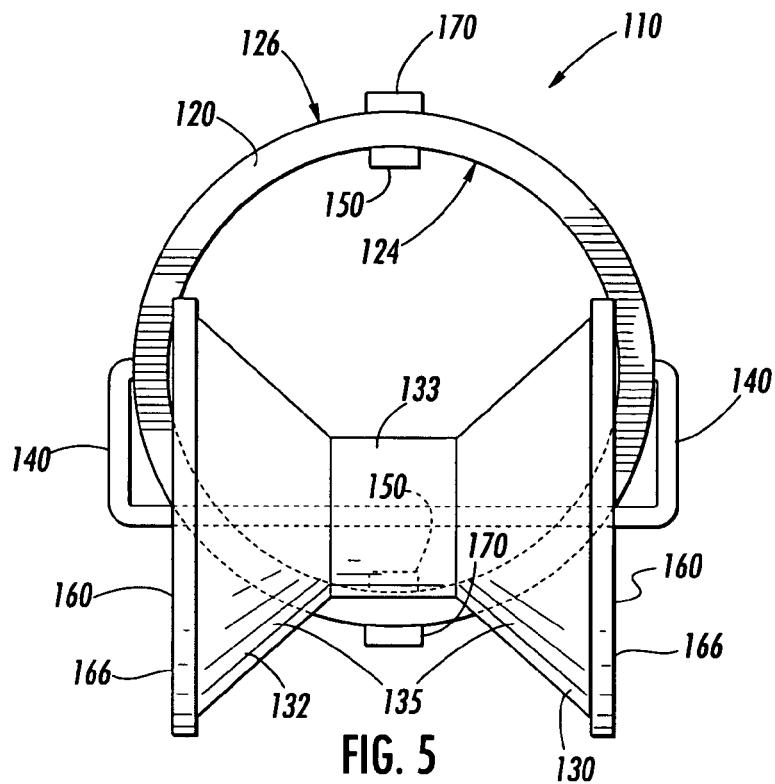
FIG. 5 is a front view of an apparatus for guiding wire according to various embodiments of the present invention.
Figure 6:
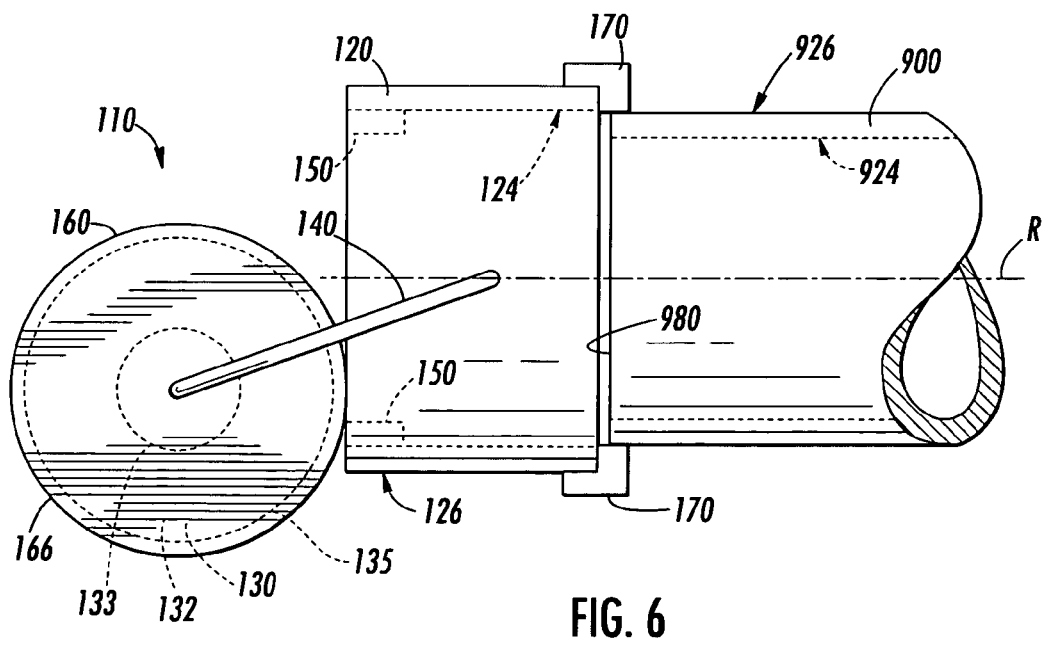
FIG. 6 is a side view the apparatus for guiding wire of FIG. 5.
Figure 7:
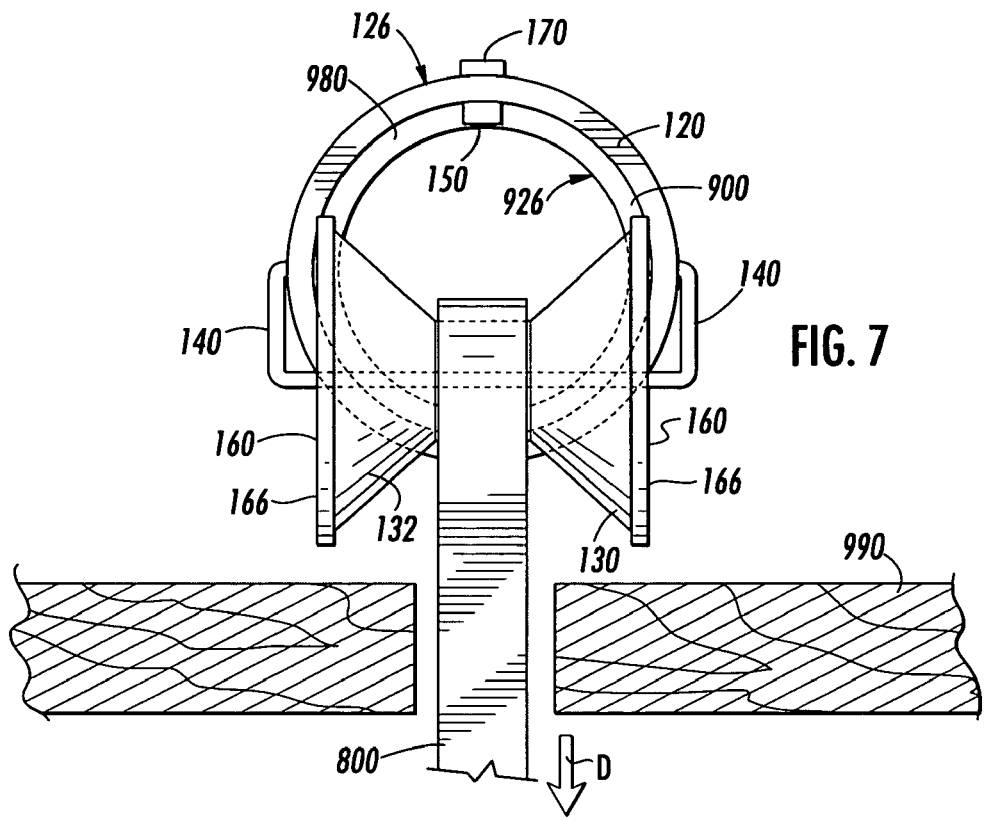
FIG. 7 is a front view of an apparatus for guiding wire according to various embodiments of the present invention.
Figure 8:
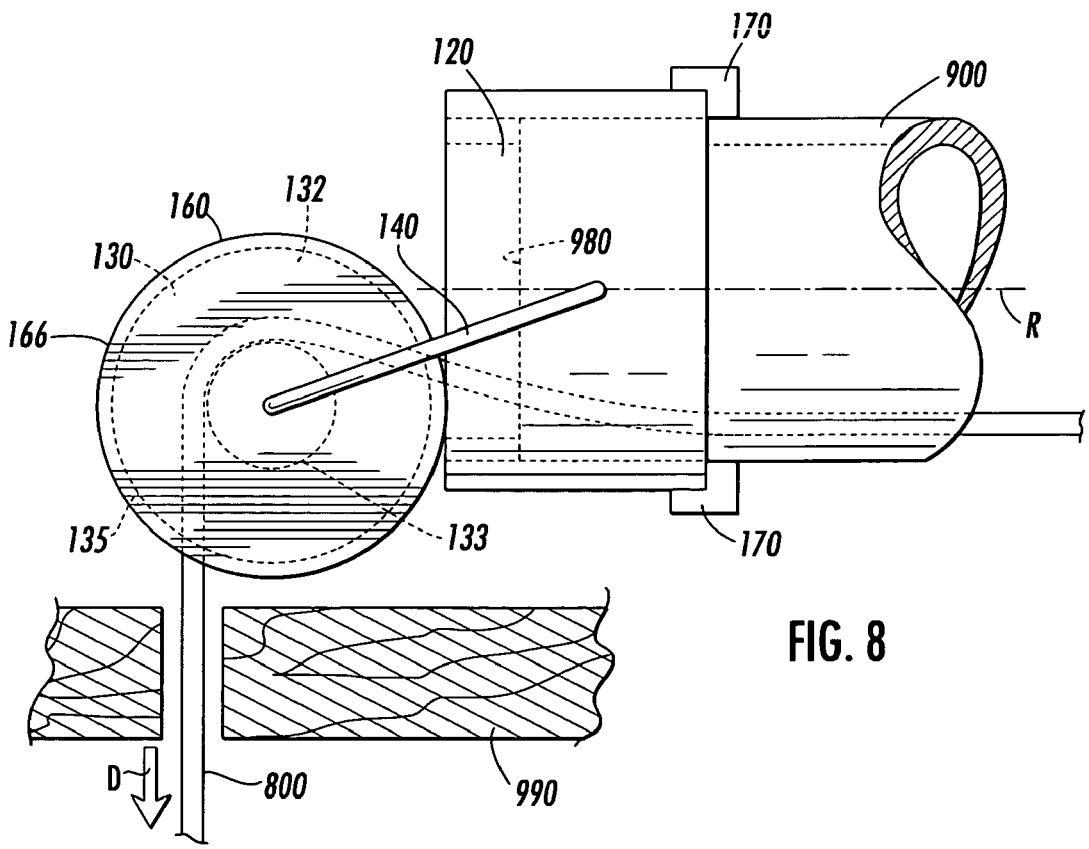
FIG. 8 is a side view the apparatus for guiding wire of FIG. 7.

FIGS. 5 and 6 depict various embodiments of an apparatus 110 for guiding wire 800. See FIGS. 7, 8. The apparatus 110 includes a raceway sleeve 120, a retainer 140 and a wire guide 130 that generally may be used by a technician (not shown), for example. As shown, the raceway sleeve 120 is capable of attachment to the end 980 of the raceway 900. The wire guide 130 is attached to the raceway sleeve 120 by the retainer 140. As shown in FIGS. 7 and 8, the wire guide 130 is further capable of receiving and guiding wire 800 such that the wire 800 does not contact the end 980 of the raceway 900.

In various embodiments, the retainer 140 attaches the raceway sleeve 120 to the wire guide 130. Alternatively, at least one retainer 140 may be used such that the position of the wire guide 130 remains in place where the wire 800 does not contact the end 980 of the raceway 900. Other retainers 140 may be used such as, for example, a plastic arm, a flexible wire, etc.

The retainer 140 is resilient as illustrated in FIGS. 5 and 6. Further, the retainer 140 is hingedly attached to the raceway sleeve 120. The retainer 140 is a single body having two arms that attach to the raceway sleeve 120. As shown, the retainer 140 passes through the wire guide 130 to maintain the position of the wire guide 130. Thus, the retainer 140 hingedly attaches the raceway sleeve 120 to the wire guide 130. As mentioned above, alternative attachments (not shown) may be used. These alternative attachments (not shown) may prevent the wire guide 130 from pivoting and may further fixedly attach the wire guide 130 to the raceway sleeve 120.

In various embodiments, the raceway sleeve 120 has an inner surface 124 and an outer surface 126. In a similar fashion, the raceway 900 has the inner surface 924 and the outer surface 926. The raceway sleeve 120 can releasably attach to the outer surface 926 of the end 980 of the raceway 900. FIGS. 7 and 8 show the raceway sleeve 120 releasably attached to the end 980 of the raceway 900. This attachment causes the inner surface 124 of the raceway sleeve 120 to abut the outer surface 926 of the raceway 900. Further, the raceway sleeve 120 has a friction fit between the raceway sleeve 120 and the raceway 900. However, other ways of attachment are possible such as, for example, gluing, welding, etc.

The wire guide 130 is configured to guide and retain the wire 800 in abutment with the wire guide 130. As shown in FIGS. 5–8, the wire guide 130 is a pulley 132. The pulley 132 has a recessed portion 133 and frustoconical portions 135. The recessed portion 133 of the pulley 132 is where the wire 800 remains in abutment with the pulley 132. As can be seen in FIGS. 7 and 8, the wire 800 rests in the recessed portion 133 of the wire guide 130, or pulley 132. The frustoconical portions 135 encourage the wire 800 to remain in the recessed portion 133. However, other configurations may be used to encourage the wire 800 to remain in the recessed portion 133. Thus, the wire guide 130 receives the wire 800.

In various embodiments, the pulley 132 generally is formed from material that is nonabrasive and has a substantially smooth outer surface 136. However, other materials may be used that enhance the friction between the pulley 132 and the wire 800. Examples of such materials include, but are not limited to, polymeric materials such as rubbers, plastics, etc. These materials allow the wire 800 to pass over the pulley 132 without damaging the wire 800 as illustrated in FIGS. 7 and 8.

FIGS. 5–8 depict the apparatus 110 as generally cylindrical in shape. However, the apparatus 110 may be configured in a variety of shapes such that the apparatus 110 is capable of attachment to the end 980 of the raceway 900. In one embodiment, the raceway 900 is cylindrical. Other shapes and configurations may be used with the apparatus 110 as it may be configured to conform to other shapes and configurations.

In various embodiments, the apparatus 110 further includes spacers 160. Alternatively, one or more spacers 160 may be used. The spacers 160 are positioned adjacent to the wire guide 130 and further contact the raceway sleeve 120. The spacers 160 are provided in FIGS. 5–8 to facilitate the rotation of the wire guide 130 such that friction does not prevent such rotation. Thus, the spacers 160 prevent the wire guide 130 from directly contacting the raceway sleeve 120.

The spacers 160 are depicted in FIGS. 5–8 as washers 166. The washers 166 may be made of various materials that have a low coefficient of friction to facilitate rotation of the wire guide 130. Examples of such materials may include, but are not limited to, metal, nylon, etc.

In various implementations, the apparatus 110 also has stops 150. The stops 150 are positioned to abut the end 980 of the raceway 900 when the apparatus 110 is affixed to the raceway 900. Alternatively, one or more stops 150 may be used. As can be seen in FIGS. 7 and 8, the raceway 900 has been inserted into the raceway attachment 120 such that the stops 150 prevent the raceway 900 from going completely through the raceway attachment 120.

As shown in FIGS. 5 and 6, the apparatus 110 further has grips 170 on the outer surface 126 of the raceway attachment 120. Alternatively, one or more grips 170 may be used. These grips 170 afford the technician with a convenient location to push on and pull off the apparatus 110 from the raceway 900.

FIGS. 7 and 8 illustrate the wire 800 as it is being pulled in a downward direction D, past the structure 990. The structure 990 may be a ceiling, for example. As shown, the wire 800 is resting in the raceway 900. The wire 800 is contacting the wire guide 130 such that the wire guide 130 receives and guides the wire 800 so that the wire 800 does not contact the end 980 of the raceway 900. The wire 800 is directed by the wire guide 130 to exit the raceway 900 through a more central location than on the edge of the raceway 900 as related to a vertical orientation in FIG. 7. In addition, the pull of the wire 800 in the downward direction D prevents the wire 800 from contacting the end 980 of the raceway 900.

In various embodiments, the positioning of the wire guide 130 is such that the recessed portion 133 is closer to the radial center R of the raceway 900 than the inner surface 924 of the raceway 900. This position at a more central location directs the wire 800 away from the end 980 of the raceway 900 at the entrance and/or exit of the raceway 900. Thus, the wire guide 130 guides the wire 800 such that the wire 800 does not contact the end 980 of the raceway 900.

The electrician or technician (not shown) affixes at least one raceway sleeve 120 to at least one end 980 of the raceway 900 to pull the wire 800 through the raceway 900. This process may also be used at the entrance and exit of the raceway 900 if two raceway sleeves 120 are utilized. Thus, the electrician or technician may affix two raceway sleeves 120 to the raceway 900 on each end 980. As shown, the wire 800 is positioned over the wire guide 130 and pulled such that the wire 800 does not contact the end 980 of the raceway 900.

Figure 9:
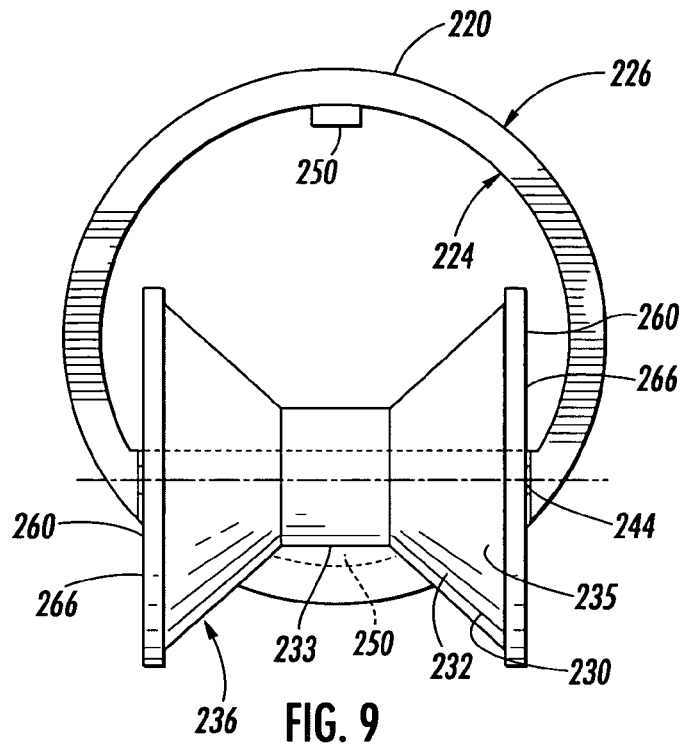
FIG. 9 is a front view of an apparatus for guiding wire according to various embodiments of the present invention.
Figure 10:
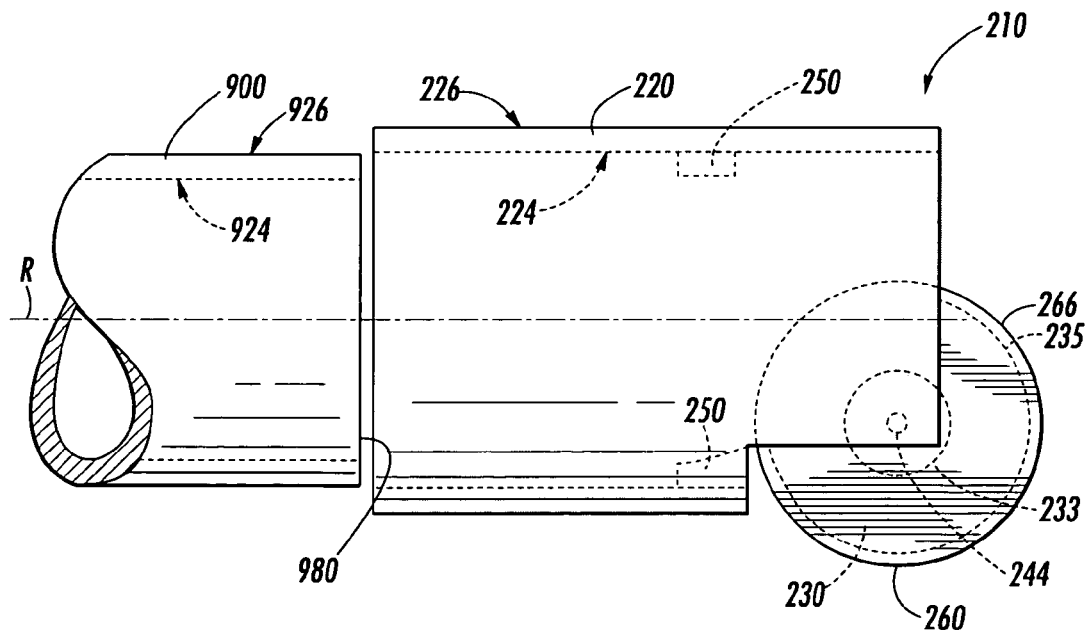
FIG. 10 is a side view the apparatus for guiding wire of FIG. 9.
Figure 11:
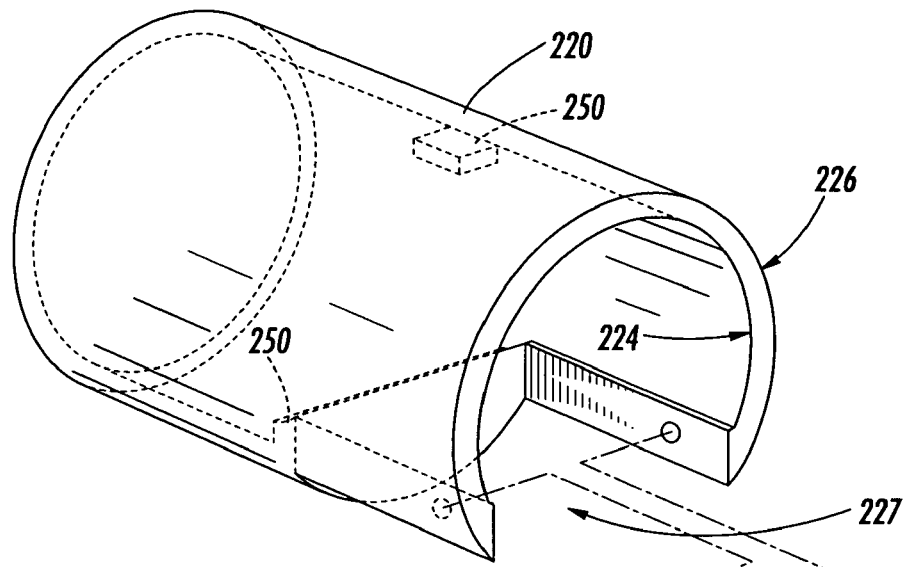
FIG. 11 is an exploded view of the apparatus for guiding wire of FIG. 9.
Figure 11:
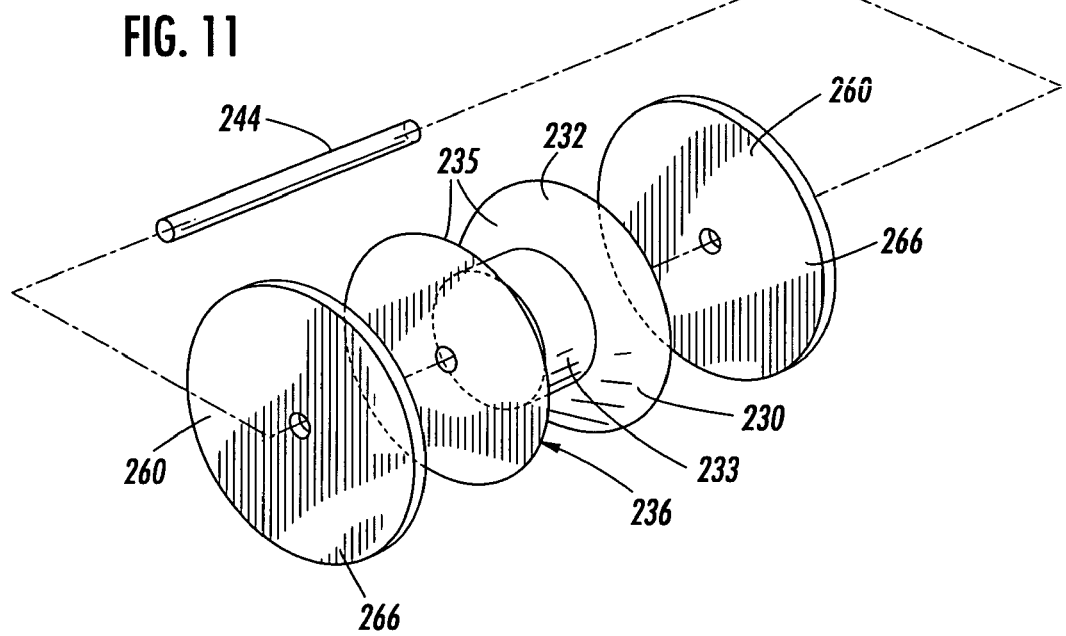

FIGS. 9–11 depict various embodiments of an apparatus 210. The apparatus 210 has a raceway attachment 220, retainer 244 and a wire guide 230. The apparatus is generally used by a technician (not shown) to pull at least one wire 800. See FIGS. 12, 13. As shown, the raceway attachment 220 is capable of attachment to the end 980 of the raceway 900. The raceway 900 may be, for example, a conduit, duct, enclosed channel, etc. The retainer 244 attaches the wire guide 230 to the raceway attachment 220 through the center of the wire guide 230 within a recess 227 of the raceway attachment 220. The wire guide 230 is capable of receiving and guiding the wire 800 such that the wire 800 does not contact the end 980 of the raceway 900. See FIGS. 12, 13.

As can be seen in the drawings, the retainer 244 is resilient. In addition, the retainer 244 attaches the wire guide 230 to the raceway attachment 220 in the recess 227. The retainer 244 forms a single body. Further, the retainer 244 passes through the center of the wire guide 230. Thus, the retainer 244 maintains the position of the wire guide 230. Alternative attachments (not shown) may be used that may prevent the wire guide 230 from rotating and may further fixedly attach the wire guide 230 to the raceway attachment 220.

Figure 12:
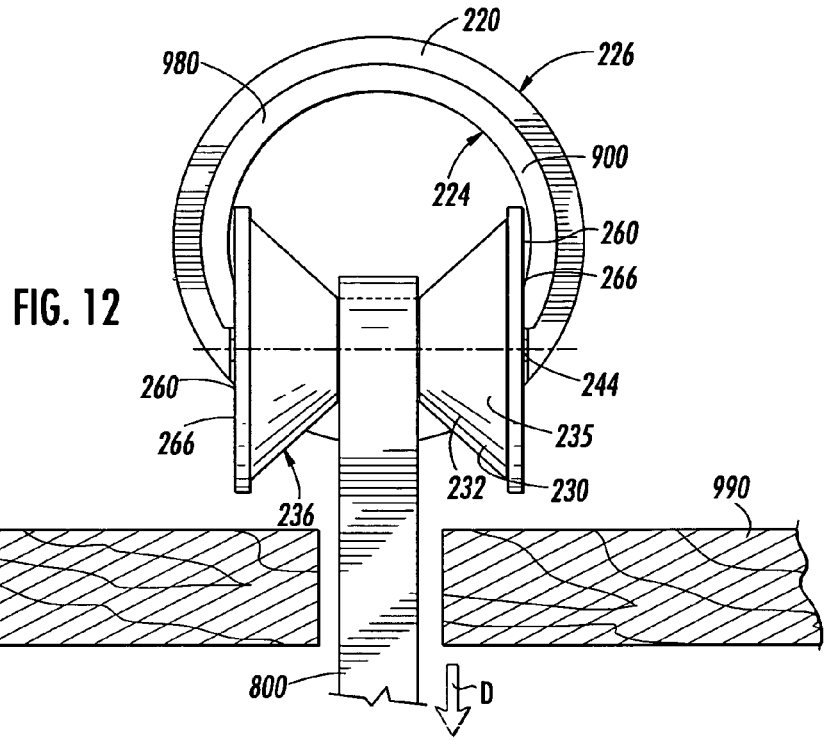
FIG. 12 is a front view of an apparatus for guiding wire according to various embodiments of the present invention.
Figure 13:
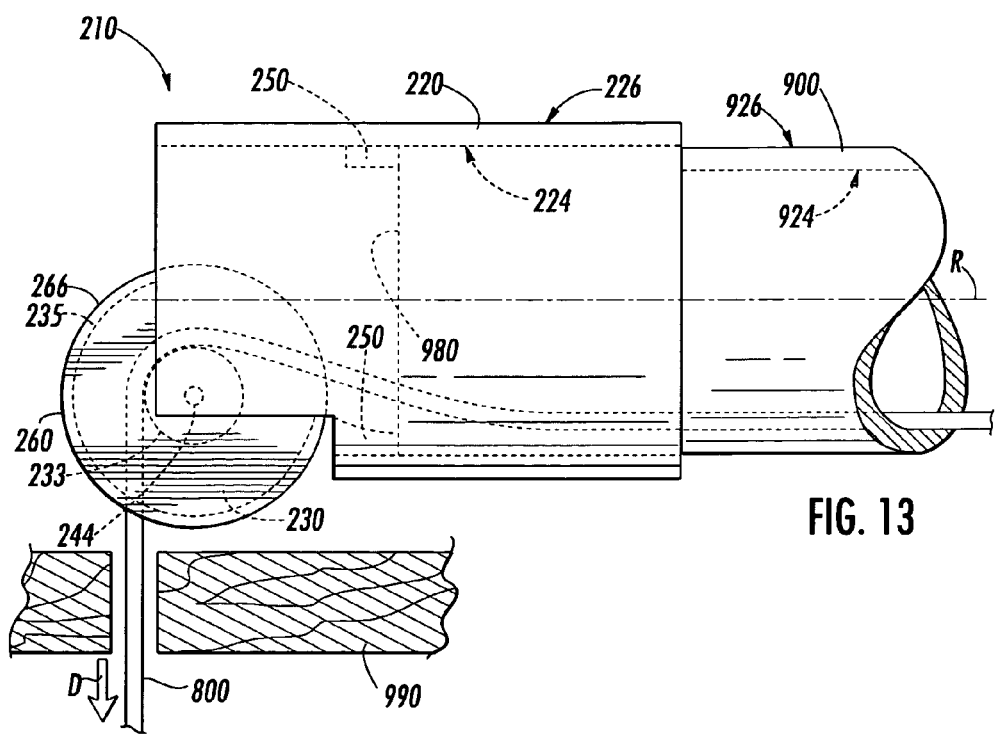
FIG. 13 is a side view the apparatus for guiding wire of FIG. 12.

In various embodiments, the raceway attachment 220 has an inner surface 224 and an outer surface 226. Likewise, the raceway 900 has the inner surface 924 and the outer surface 926 as shown in FIG. 10. The raceway attachment 220 can releasably attach to the outer surface 926 of the end 980 of the raceway 900. Further, FIGS. 12 and 13 show the raceway attachment 220 releasably attached to the end 980 of the raceway 900. This attachment causes the inner surface 224 of the raceway attachment 220 to abut the outer surface 926 of the raceway 900. Further, as illustrated, the raceway attachment 220 has a friction fit between the raceway attachment 220 and the raceway 900. However, other ways of attachment are possible such as, for example, gluing, welding, etc.

The wire guide 230 is configured to guide and retain the wire 800 in abutment with the wire guide 230 as depicted in FIGS. 12 and 13. As shown, the wire guide 230 is a pulley 232. The pulley 232 has a recessed portion 233 and frustoconical portions 235. The recessed portion 233 of the pulley 232 is where the wire 800 remains in abutment with the pulley 232. As can be seen in FIGS. 12 and 13, the wire 800 rests in the recessed portion 233 of the wire guide 230, or pulley 232. The frustoconical portions 235 encourage the wire 800 to remain in the recessed portion 233. However, other configurations may be used to encourage the wire 800 to remain in the recessed portion 233. Thus, the wire guide 230 receives the wire 800.

The pulley 232 generally is formed from a material that is nonabrasive and has a substantially smooth outer surface 236. However, other materials may be used that enhance the friction between the pulley 232 and the wire 800. Examples of such materials include, but are not limited to, polymeric materials such as rubbers, plastics, etc. These materials allow the wire 800 to pass over the pulley 232 without damaging the wire 800 as illustrated in FIGS. 12 and 13.

FIGS. 9–13 depict the apparatus 210 as generally cylindrical in shape. However, the apparatus 210 may be configured in a variety of shapes such that the apparatus 210 is capable of attachment to the end 980 of the raceway 900. In one embodiment, the raceway 900 is cylindrical. Other shapes and configurations may be used with the apparatus 210 as it may be configured to conform to other shapes and configurations.

In various embodiments, the apparatus 210 further includes spacers 260. Alternatively, one or more spacers 260 may be used. The spacers 260 are positioned adjacent to the wire guide 230 and further contact the raceway attachment 220. The spacers 260 facilitate the rotation of the wire guide 230 such that friction does not prevent such rotation. Thus, the spacers 260 prevent the wire guide 230 from directly contacting the raceway attachment 220.

The spacers 260 are depicted in FIGS. 9–13 as washers 266. The washers 266 may be made of various materials that have a relatively low coefficient of friction to facilitate rotation of the wire guide 230. Examples of such materials may include, but are not limited to, metal, nylon, etc.

FIGS. 12 and 13 illustrate the wire 800 as it is being pulled in an upward direction U, past the structure 990, which may be a ceiling, for example. As shown, the wire 800 is resting in the raceway 900. The wire 800 is contacting the wire guide 230 such that the wire guide 230 receives and guides the wire 800 so that the wire 800 does not contact the end 980 of the raceway 900. The wire 800 is directed by the wire guide 230 to exit the raceway 900 through a central location in a vertical orientation in FIG. 13. In addition, the pull of the wire 800 in the downward direction D, prevents the wire 800 from contacting the end 980 of the raceway 900.

In various embodiments, the positioning of the wire guide 230 is such that the recessed portion 233 is closer to the radial center R of the raceway 900 than the inner surface 924 of the raceway 900. This position at a more central location, directs the wire 800 away from the end 980 of the raceway 900 at the entrance and/or exit of the raceway 900. Thus, the wire guide 230 guides the wire 800 such that the wire 800 does not contact the end 980 of the raceway 900.

To install and use the apparatus 210, the electrician or technician (not shown) would affix at least one raceway attachment 220 to at least one end 980 of the raceway 900 and pull the wire 800 through the raceway 900. This process may also be used at the entrance and exit of the raceway 900 if two raceway attachments 220 are utilized. Thus, the technician may affix two raceway attachments 220 to the raceway 900 on each end 980. As shown, the wire 800 would be positioned over the wire guide 230 and pulled such that the wire 800 does not contact the end 980 of the raceway 900.

As can be seen in the drawings, the wire guides and raceway attachments have cylindrical-like configurations. It will be appreciated that other configurations will be within the spirit and scope of the invention for varying applications of raceways and that these particular configurations may lend themselves to simple construction. Other configurations include a somewhat complementary shape to the raceway for the given application. As mentioned above, the raceway may be a conduit, a duct or other enclosed channel. Further, the various embodiments of the invention may be reusable or disposable given the parameters that may define such a design that may include, for example, costs to manufacture and durability of a specific embodiment.

Whereas particular embodiments of the invention have been described herein for the purpose of illustrating the invention and not for the purpose of limiting the same, it will be appreciated by those of ordinary skill in the art that numerous variations of the details, materials, configurations and arrangement of parts may be made within the principle and scope of the invention without departing from the spirit of the invention. The preceding description, therefore, is not meant to limit the scope of the invention.

What is claimed is:

1. An apparatus for guiding wire, the apparatus comprising:
   a raceway attachment adapted to attach the end of a raceway;
   a retainer;
   a wire guide attached to the raceway attachment by the retainer, the wire guide capable of receiving and guiding the wire such that the wire does not contact an end of the raceway;
   at least one spacer adjacent to the wire guide and contacting the raceway attachment.

2. The apparatus of claim 1, wherein the raceway attachment releasably attaches to an outer surface of the end of the raceway.

3. The apparatus of claim 1, wherein the retainer has at least one attachment arm and wherein the wire guide attaches to the raceway attachment by the at least one attachment arm.

4. The apparatus of claim 3, wherein the retainer is resilient.

5. The apparatus of claim 3, wherein the at least one attachment arm hingedly attaches the raceway attachment to the wire guide.

6. The apparatus of claim 1, wherein the raceway attachment has at least one stop positioned abut the raceway.

7. The apparatus of claim 1, wherein the raceway attachment has at least one grip.

8. The apparatus of claim 1, wherein the wire guide is configured to guide and retain the wire in abutment with the wire guide.

9. The apparatus of claim 1, wherein the raceway attachment has a friction fit between the raceway attachment and the raceway.

10. The apparatus of claim 1, wherein the raceway attachment is nonabrasive and has a substantially smooth outer surface.

11. The apparatus of claim 1, wherein the wire guide is a pulley.

12. An apparatus for guiding wire, the apparatus comprising:
   a raceway sleeve;
   a wire guide;
   a retainer attaching the raceway sleeve to the wire guide, the wire guide capable of receiving and guiding the wire such that the wire does not contact an end of a raceway; and
   at least one spacer adjacent to the wire guide and contacting the raceway sleeve.

13. The apparatus of claim 13, wherein the raceway sleeve has a recess for receiving the wire guide.

14. The apparatus of claim 12, wherein the raceway sleeve has at least one grip.

15. The apparatus of claim 12, wherein the wire guide is configured to guide and retain the wire in abutment with the wire guide.

16. The apparatus of claim 12, wherein the raceway sleeve has at least one stop positioned to abut the raceway.

17. An apparatus for guiding wire, the apparatus comprising:
- a raceway attachment adapted to attach the end of a raceway;
- a retainer;
- a wire guide attached to the raceway attachment by the retainer, the wire guide capable of receiving and guiding the wire such that the wire does not contact an end of the raceway,
- wherein the retainer has at least one attachment arm and wherein the wire guide attaches to the raceway attachment by the at least one attachment arm, and wherein the at least one attachment arm hingedly attaches the raceway attachment to the wire guide.

18. The apparatus of claim 17, wherein the raceway attachment releasably attaches to an outer surface of the end of the raceway.

19. An apparatus of claim 17, wherein the raceway attachment has at least one stop positioned to abut the raceway.

20. The apparatus of claim 17, wherein the wire guide is a pulley.

* * * * *